May 22, 1934.   E. K. BAKER   1,959,563
AUTOMOBILE ARM AND ROD CONNECTION
Filed March 31, 1930

Inventor:
Eric K. Baker
by:- Arthur W. Nelson
Atty.

Patented May 22, 1934

1,959,563

UNITED STATES PATENT OFFICE 1,959,563

AUTOMOBILE ARM AND ROD CONNECTION

Erle K. Baker, Chicago, Ill., assignor to Baker Axle Company, Cleveland, Ohio, a corporation of Ohio Application March 31, 1930, Serial No. 440,209

3 Claims. (Cl. 287—90)

This invention relates to improvements in automobile arm and rod connection and it consists of the matters hereinafter described and more particularly pointed out in the appended claims.

The primary object of the invention is to provide a simple and efficient structure especially adapted for use in automobiles as a connection between certain coacting parts thereof such as between the knuckle arms and drag links and between other associated parts.

Another object of the invention is to provide a connection of this kind between coacting arm and rod members wherein a head carried by one of said members is provided with a raceway to receive anti-friction elements that engage with a spherical bearing surface in the other member, the head being engaged at a point that approximates the center of said surface to hold the head and said element in operative position with respect to said bearing surface.

A further object of the invention is to provide a connection of this kind which is practical, and includes but a relatively few parts that are easily assembled and are held in a manner permitting free relative oscillation between the associated members without displacement.

The above mentioned objects of the invention as well as others, together with the many advantages thereof will more fully appear as I proceed with my specification.

In the drawing:—

Figure 1:
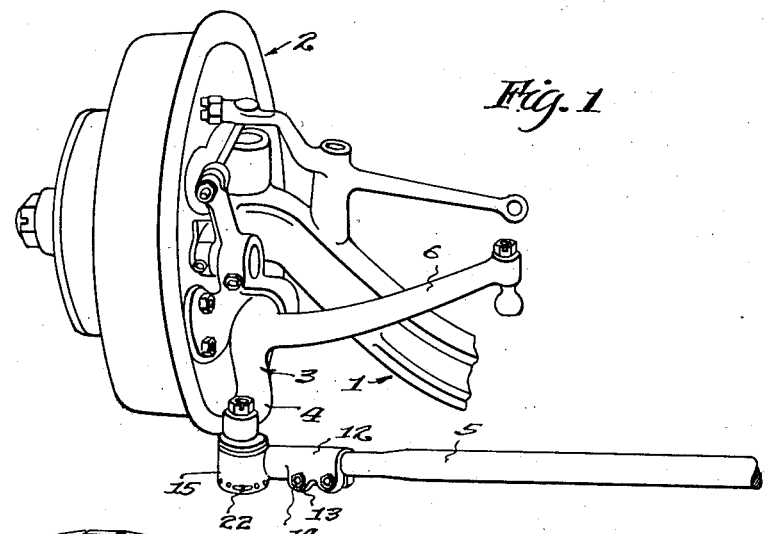
Fig. 1 is a fragmentary perspective view of a connection embodying my invention as when employed between the arm of a steering knuckle and one end of an associated tie rod or link.
Figure 2:
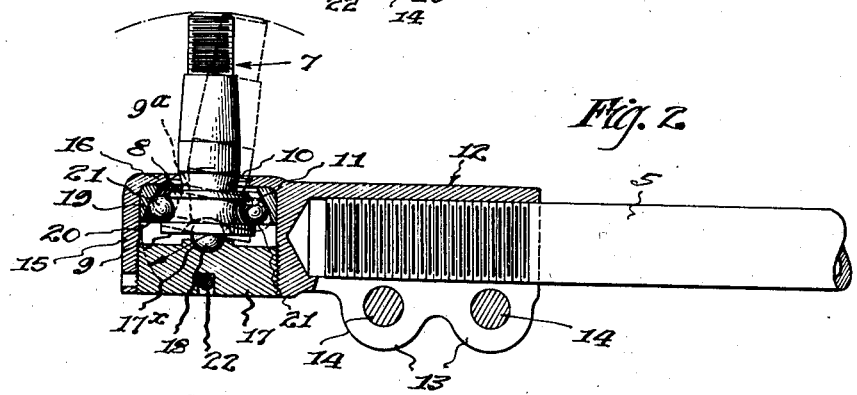
Fig. 2 is a vertical sectional view on an enlarged scale through a connection of this kind embodying my invention.

Referring now in detail to that embodiment of the invention illustrated in Figs. 1 and 2 of the accompanying drawing, 1 indicates the front axle of an automobile and 2 indicates the brake drum and coacting parts of a wheel (not shown) associated with said axle and operatively connected thereto by means of a steering knuckle 3. Said knuckle includes an arm 4 that is operatively connected to the like arm of another associated knuckle by a tie rod or link 5 and the left hand knuckle includes a thrust arm 6 which is operatively connected by a thrust rod (not shown) with the usual steering mechanism as is well known in automobiles.

Fixed to and depending from the free end of the arm 4 is a stud 7 having a body adapted for a tapered fit in said arm and at the bottom of said body is a circular head 8 having a substantially flat end 9. In said head which is connected to the body by a neck 10 is a peripheral ball race groove 11.

On the end of the tie rod or link 5 which may be of either a solid or tubular cross section there is provided a member 12 preferably made separate from said rod and adapted for screw threaded adjustment thereon. The body of this member is split longitudinally at one side and is there provided with ears 13 to receive bolts 14 whereby after said member has been properly positioned on said link or rod it may be securely fixed thereto.

The free end of the body of said member 12 is formed to provide a hollow boss 15, interiorly threaded at one end and having an inwardly extending radial flange 16 at its other end. The interiorly threaded end of said boss is adapted to receive and be closed by a plug 17 having a centrally arranged hemispherical seat $17^x$ in its inner end in which is seated a ball 18. In the flat end 9 of the head is formed a hemispherical seat $9^a$ made on a radius greater than that of the ball 18, which normally engages said recess at a point in the axial plane of the stud 7. In the boss 15 and engaged against the flange 16 is a ring 19 having an interior spherical bearing surface 20, the center of which is approximated by the center of the ball 18.

In the race or groove 11 is located a plurality of balls 21 that also engage the spherical surface of the ring 19. In the assembly of the structure thus far described the stud 7, balls 21 and ring 19 are first brought together in operative relation and then inserted into the boss 15 from its open end. The plug 17 with the ball 18 thereon is then screwed in place in the boss 15 and is then locked in place by a pin 22.

Figure 3:
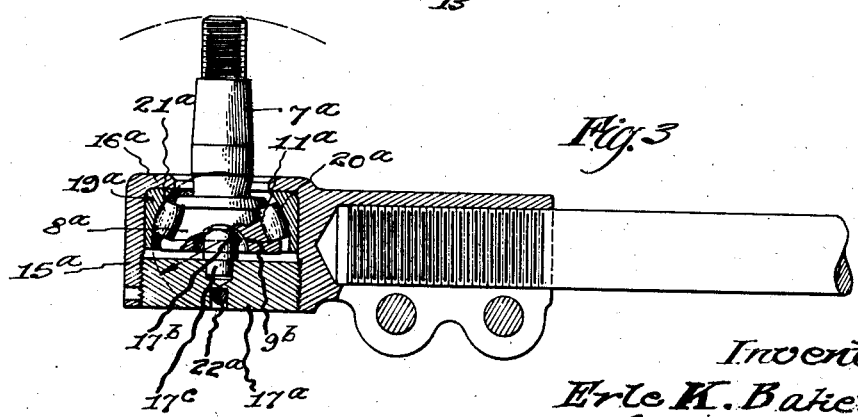
Fig. 3 is a view similar to Fig. 2 showing a modified form of the invention.

In Fig. 3 I have shown a slightly modified form of my invention. In said figure, $7^a$ indicates the stud and $15^a$ indicates the hollow boss in which it is located. The head $8^a$ of the stud is provided in its flat bottom end with a hemispherical recess $9^b$ in which is engaged the hemispherical end $17^b$ of a stud $17^c$ arranged centrally in the inner end of a plug $17^a$, screw threaded in one end of the boss $15^a$.

The other end of the boss is turned inwardly to provide a radial flange or shoulder $16^a$ and within said boss and engaged against said shoulder is a ring $19^a$ having an interior spherical surface $20^a$ substantially universally concentric with the center of the hemispherical end 17$^b$ of the stud 17$^a$. In said head is provided a peripheral groove 11$^a$ that is of a cross section complemental to that of the bearing surface so that said groove and surface receive between them anti-friction rollers 21$^a$ the axes of which taper toward the free end of the body of the stud 7$^a$.

In the assembly of the connection just described the stud 7$^a$ and anti-friction rollers 21$^a$ together with the ring 19$^a$ are first brought together in operative relation and then inserted into the boss 15$^a$ from the open bottom end thereof. Thereafter the plug 17$^a$ is screwed in place. In this assembly the interior of the boss may be filled with a lubricant. After the plug 17$^a$ has been adjusted it may be locked against movement by the pin 22$^a$.

With the construction made as described, the stud 7$^a$ may oscillate in all directions with an anti-friction bearing with respect to the boss.

While in describing the invention, I have referred in detail to the form, arrangement and construction of the parts, the same is to be considered merely as illustrative so that I do not wish to be limited thereto, except as may be specifically set forth in the appended claims.

I claim as my invention:—

1. In combination with a member having a recess therein and a second member having a head disposed in said recess, a ring having a shouldered engagement with said first mentioned member and providing a spherical internal bearing surface in said recess, anti-friction elements between said head and surface, and means including a rounded portion mounted on a part fixed with respect to the first member and engaged with said head, the center of said rounded portion approximating the center of said bearing surface and whereby said means holds said head in operative relation with respect to said bearing surface in the oscillation of said head in the first mentioned member.

2. In combination with a member having a recess therein defined at one end by an inwardly extending radial flange, an annular member engaged with said flange and providing an internal spherical bearing surface in said recess, a member having a head in said recess and formed to provide a bearing surface complemental to that of said spherical bearing surface and which head has an annular groove therein, anti-friction elements arranged in said groove and engaged with said internal spherical bearing surface, means providing a closure for the other end of said recess and a device carried by said last mentioned means and having a rounded portion thereof engaged with said head for positively holding said elements in operative relation with respect to said spherical bearing surface, the center of said rounded portion being coincident with that of said surface.

3. A tie rod construction embodying therein a housing member having means at one end thereof providing a substantially hemispherical internal bearing surface, a plug closing the other end of said housing member, a stud member including a head disposed in said housing and provided with an annular groove and a substantially hemispherical recess in that end opposite the stud and arranged off center with respect to said bearing surface, antifriction elements in said groove and engaging said external bearing surface, a device mounted on said plug and including a rounded portion engaged in said recess in said end of the head and which rounded portion is concentric with respect to said internal bearing surface and operates as a fulcrum point holding said head in operative relation with respect to said bearing surface in the oscillation of the head in said housing.

ERLE K. BAKER.